United States Patent [19]

Imamura

[11] 4,305,713
[45] Dec. 15, 1981

[54] ENDLESS POWER TRANSMISSION BELT

[75] Inventor: Junji Imamura, Kobe, Japan

[73] Assignee: Mitsuboshi Belting Limited, Kobe, Japan

[21] Appl. No.: 39,729

[22] Filed: May 17, 1979

[30] Foreign Application Priority Data

Sep. 19, 1978 [JP] Japan .................. 53-129165[U]

[51] Int. Cl.³ .................... F16G 5/16; F16G 5/00
[52] U.S. Cl. .................... 474/238; 474/262
[58] Field of Search .................... 74/232, 233, 234; 474/238, 262, 250

[56] References Cited

U.S. PATENT DOCUMENTS

| | | | |
|---|---|---|---|
| 1,612,024 | 12/1926 | Jacobs | 74/232 |
| 2,792,319 | 5/1957 | Fihe | 74/233 |
| 3,212,627 | 10/1965 | Beebee | 74/232 |
| 3,404,577 | 10/1968 | Zahn | 74/229 |
| 3,564,933 | 2/1971 | Clinkenbeard | 474/238 |
| 3,820,409 | 6/1974 | Meadows | 74/233 |
| 3,838,605 | 10/1974 | Muller | 74/234 |
| 3,853,017 | 12/1974 | White et al. | 74/234 |
| 3,948,113 | 4/1976 | Stork | 74/234 |
| 3,996,813 | 12/1976 | Henderson et al. | 74/234 |
| 4,011,766 | 3/1977 | Waugh | 474/250 |
| 4,177,688 | 12/1979 | Howerton et al. | 74/233 |

*Primary Examiner*—Lawrence J. Staab
*Attorney, Agent, or Firm*—Sughrue, Mion, Zinn, Macpeak & Seas

[57] ABSTRACT

An endless power transmission belt comprising a plurality of V-belt parts spaced laterally apart from one another and tie band having an improved structure and connecting the V-belt parts together. The V-belt part and the tie band are essentially made of elastomer material and fabrics. More specifically, the tie band is made up of at least two cord fabric layers and an elastomer material in which the cord fabric layers are embedded. An intermediate elastomer material layer is provided between the fabric layers. The fabric layers are made of cords which are extended obliquely with respect to the longitudinal axis of the belt in such a manner that the cords forming one fabric layer form an angle with the cords forming another fabric layer adjacent thereto. The upper surfaces of the plurality of V-belt parts are connected by the tie band thus constructed, to form one unit.

11 Claims, 4 Drawing Figures

ENDLESS POWER TRANSMISSION BELT

BACKGROUND OF THE INVENTION

This invention relates to an improvement for an endless belt for transmitting power from a driving pulley to a driven pulley. More particularly it relates to a power transmission belt for heavy loads, which transmit great torque from a driving pulley mounted on a driving shaft to a driven pulley mounted on a driven shaft.

An object of this invention is to improve the flexibility, side pressure durability and crack resistance of a power transmission belt. Also, it is an object of this invention to eliminate drawbacks such as vibration, removal and turning-over accompanying a conventional multi-V-belt drive system, and to eliminate power transmission loss due to the unequal lengths of plural belts. Hence, this invention seeks to increase the service life of a power transmission belt.

In the aforementioned multi-V-belt drive system, generally a plurality of power transmission V-belts are laid over a single pulley having a plurality of pulley grooves, and the V-belts are liable to be of different length. Therefore, loads applied to the V-belts are different, and accordingly loads are collectively applied to a particular belt among the belts. As a result the life of that belt is shortened. Furthermore, in the case where a machine such as a crusher or a compressor having a great impact force is driven by the multi-V-belt system, the belts are vibrated and are brought into contact with adjacent belts. As a result the belt or belts may be turned over or may be dropped off the pulley.

In order to overcome these difficulties, a power transmission belt has been proposed by U.S. Pat. No. 3,404,577 issued to Zahn, in which the upper surfaces of plural V-belt bodies are connected by an elastomer tie band in which a plurality of nylon cords substantially 90° with the longitudinal axis of the belt are embedded. This conventional belt is excellent in flexibility in the longitudinal direction of the belt. However, where the belt is used with a small diameter pulley, the rubber between the cords, which forms the tie band, repeatedly excessively elongated in the longitudinal direction. Hence, it is liable to be cracked. Since the nylon cords are extended in the widthwise direction of the belt, the belt is rigid in the widthwise direction, but it is low in stretchability. Thus, the belt cannot sufficiently follows motions in the widthwise direction thereof.

In addition, U.S. Pat. No. 3,564,933 issued to Clinkenbeard disclose a belt in which the upper surfaces of V-belt bodies are connected by a tie band which is obtained by embedding wide angle cloth in an elastomer material. Since the tie band includes the wide angle cloth, the tie band is relatively high in stretchability in the lengthwise and widthwise directions of the belt. However, when the belt is used with a small diameter pulley, it still suffers from the following disadvantages. The wide angle cloth is a fabric made up of warps and wefts, and the warps and wefts intersect with one another. Therefore, as the belt is bent on a small diameter pulley, the tie band is elongated considerably in the longitudinal direction of the belt and simultaneously the wide angle cloth of the tie band is also elongated. In this operation, the warps and the wefts are abraded by each other, and they are easily damaged.

The warps and wefts of the wide angle cloth are extended in a wavy state during weaving. Therefore, the rigidity, in the widthwise direction of the belt, of the wide angle cloth is not as high as expected. Accordingly, the V-belt bodies are dropped in the pulley grooves, as a result the service life of the belt is relatively short.

SUMMARY OF THE INVENTION

In order to eliminate the drawbacks accompanying a conventional belt, a belt according to the invention has the following specific features: This invention is an endless power transmission belt comprising a plurality of V-belt parts spaced laterally apart from one another and a tie band having an improved structure and connecting the V-belt parts together. The V-belt parts and the tie band are essentially made of elastomer material and fabrics. More specifically, the tie band is made up of at least two cord fabric layers and an elastomer material in which the cord fabric layers are embedded. An intermediate elastomer material layer is provided between the fabric layers. The fabric layers are made of cords which extend obliquely with respect to the longitudinal axis of the belt in such a manner that the cords forming one fabric layer form an angle with the cords forming another fabric layer adjacent thereto. The upper surfaces of the plurality of V-belt parts are connected by the tie band thus constructed, to form one unit.

In addition to the above-described structural features, the belt according to the invention has the following significant merits. In the belt according to the invention, cord fabrics are laminated in cross state through the intermediate elastomer material layer, and therefore, unlike the wide angle woven fabric in the conventional belt disclosed by U.S. Pat. No. 3,564,933 (Clinkenbeard), the tie band has no intersection points of wavy threads, and accordingly the belt will never be damaged by abrasion. The laminated cord fabrics are embedded in the elastomer material according to the invention. Therefore, when the cord fabrics are bent, the elastomer material serves as cushion. Thus, the tie band, and accordingly the belt will not be cracked, and can maintain the flexibility for a protracted period of time. Accordingly, the belt according to the invention is free from the vibration, removal and turning-over, which occur with the conventional belts. Furthermore, the belt according to the invention can increase the belt service life and improve the power transmission performance.

This invention will be described with reference to the drawings and the description of the preferred embodiments that follows.

BRIEF DESCRIPTION OF THE INVENTION

DESCRIPTION OF THE PREFERRED EMBODIMENTS

Figure 1:
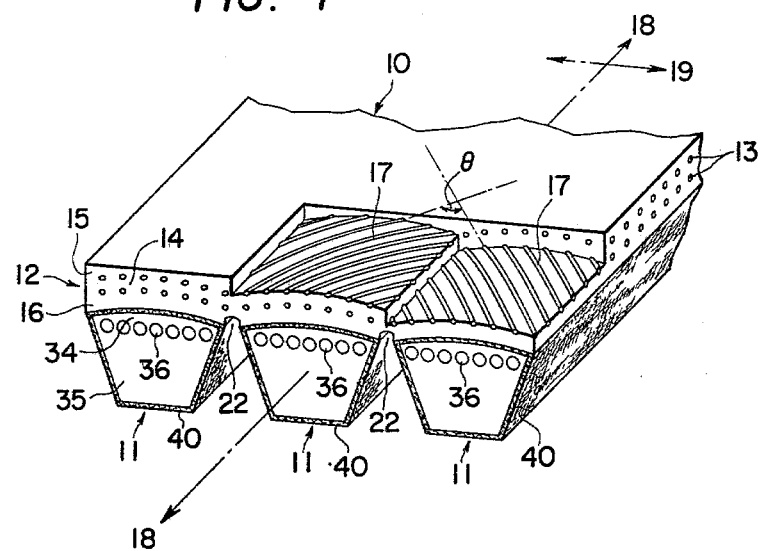
FIG. 1 is a perspective view, with parts cut away, showing a first embodiment of a belt according to the invention.

FIG. 1 shows a first preferred embodiment of an endless power transmission belt. This belt 10 comprises an elastomer and woven fabric. More specifically, the belt 10 comprises a plurality of V-belt parts 11 having a trapezoid section, arranged side by side, and a tie band 12 bonded to the surfaces of the V-belt parts 11 to combine the latter as one unit. The tie-band 12 is made of elastomer material reinforced by at least two layers of cord fabric 13. An intermediate elastomer material layer 14 is provided between the fabric layers. Both of the inner and outer surfaces of each fabric layer are covered with the same elastomer materials 15 and 16 as that of the intermediate elastomer material layer 14.

The cord fabric layer 13 has a plurality of cords 17 extending parallel with each other. The cords are extended forming an angle with respect to the longitudinal axis of the belt 10, and the cords of one fabric layer form an angle $\theta$ with the cords of another fabric layer adjacent to the one fabric layer. The angle $\theta$ formed by the cords of the adjacent fabric layers is in a range of from 95° to 155° and is an obtuse angle with respect to the longitudinal axis 18 of the belt. Thus, the tie-band 12 is stretchable both in the longitudinal direction 18 and the widthwise direction 19 of the belt.

Figure 3:
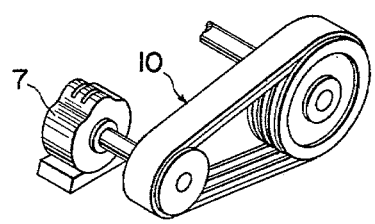
FIG. 3 is a perspective view showing the belt according to the invention, which is laid over pulleys.

As shown in FIG. 3, the belt 10 according to the invention is laid over a driving pulley and a driven pulley. The rotation of a motor 7 is transmitted through the drive shaft to the driving pulley. The rotation of the driving pulley is transmitted through the belt 10 to the driven pulley.

The V-belts parts of the belt 10 are fitted in the grooves of the pulleys. The non-parallel sides of the V-belt parts are brought into close contact with the side wall of the pulleys, and accordingly the power is transmitted.

In the case where the dimensions of the pulley grooves are not suitable or the belt is excessively worn after it has been used for a long period of time, the belt may be elongated in the widthwise direction. The portion of the tie band between the adjacent V-belt parts can especially be greatly elongated. However, since at least two layers of cord fabric are provided in the tie band, the above-described difficulty is eliminated. That is, the belt can run satisfactorily without being affected by the V-belt parts.

In the case where the belt according to the invention is laid over a driving pulley and a driven pulley one or both of which are smaller in diameter, the tie band of the belt is repeatedly elongated longitudinally. However, since the intermediate elastomer material layer is provided between the fabric layers, i.e., the cords forming one of the fabric layers are not in direct contact with the cords forming the other fabric layer, the cords will not be worn out and accordingly the belt will not damaged.

The cords of the adjacent fabric layers of the tie band extend obliquely with respect to the longitudinal axis of the belt in such a manner that they form an angle with one another. Therefore, when the belt is elongated longitudinally and accordingly the tie band is elongated longitudinally, the intermediate elastomer material layer between the cords of the one fabric layer is elongated following the elongation of the belt. But, the cords of another fabric layer adjacent to the above-described fabric layer suppress the elongation. Thus, the intermediate elastomer material layer is protected from excessive elongation. Because of this mutual action, it is possible to prevent the elastomer material layer forming the tie band from cracking. As a result, the service life of the belt is lengthened.

Referring back to FIG. 1, each V-belt part 11 comprises a tension section 34, a compression section 35 and a neutral axis section 36. The neutral axis section 36 is provided between the tension section 34 and the compression section 35. It is a continuous cord wound helically. The entire outer wall of each V-belt part 11 is covered with a conventional outer cover 40. Each V-belt part 11 is connected to the tie band 12 through the outer surface of the cover surrounding the tension section 34 thereof.

An air gap 22 is disposed between adjacent V-belt parts 11 and under the tie band. During the run of the belt 10 on the pulley, the surfaces of the V-belts in contact with the pulley are worn out and the position of the belt is lowered in the pulley. However, due to the air gap 22, the contact of the tie band with the protrusions of the pulley can be prevented, and therefore the V-belt parts provide the effective wedge effect.

Figure 4:
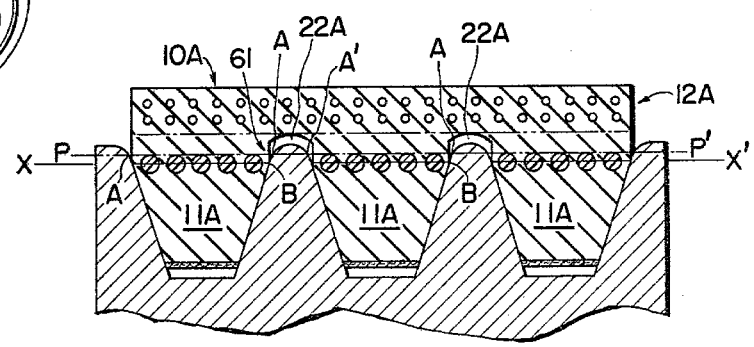
FIG. 4 is a sectional view showing the belt according to the invention, which is laid over a pulley.

As shown in FIG. 4, the air gap 22 is formed so that both ends of the tension section 34A of the V-belt part 11a are folded vertically to form two vertical ends. One of the two vertical ends and a vertical end of the adjacent V-belt part, which confronts one of the two vertical ends are spaced apart from each other by at least the width (between the points A and A') of the arc formed by the protrusion of pulley.

Alternatively, as shown in FIG. 1, the air gap is formed by the following method. At the connection point of adjacent V-belt parts, a groove having an inverted U section is extended longitudinally in the elastomer material layer 16 below the tie band. Both sides of the grooves are continued to the two confronting walls of the adjacent V-belt parts.

As shown in FIG. 4, the line X—X' connecting laterally the centers of the cords forming the neutral axis sections of the V-belt parts is positioned inwardly of the driving side surface of the pulley groove. In other words, the line X—X' is positioned on or below the line P—P' connecting the upper ends 13 of the contact surfaces between the V-belt parts and the pulley grooves. This plays an important role in increasing the power transmission performance of the belt.

Figure 2:
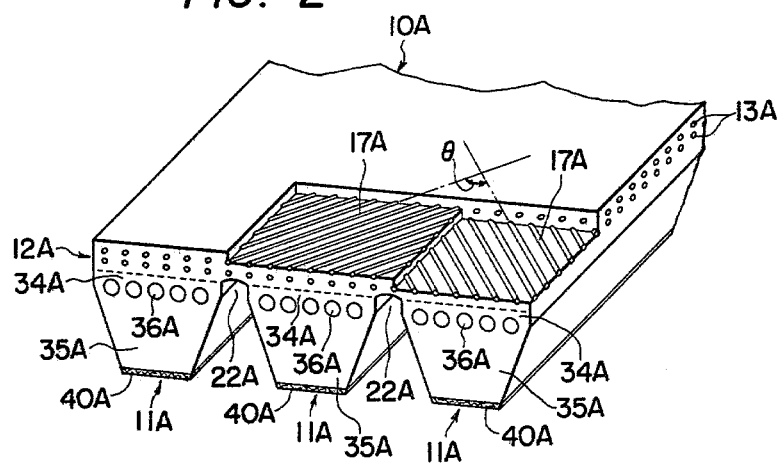
FIG. 2 is a perspective view, with parts cut away showing a second embodiment of the belt according to the invention.

A second preferred embodiment of the power transmission belt according to the invention is shown in FIG. 2. Since the construction of the belt shown in FIG. 2 is partially similar to that of the belt shown in FIG. 1, those components which have been already described with reference to FIG. 1 are similarly numbered with a suffix letter A and will not be again described in detail. Thus, only components different from those in the belt shown in FIG. 1 will be described with new reference numerals.

The belt 10 in FIG. 1 is a so-called "wrapped type belt" in which each V-belt part having a trapezoid section is covered in its entirety with the cover 40. The belt 10A in FIG. 2 is "a raw edge type belt" in which each V-belt part 11A of the belt 10A has no cover, thus being a different construction from the belt 10 in FIG. 1.

Each V-belt part 11A comprises a tension section 34A, a compression section 35A, a neutral axis section 36A formed by cords, and an outer cover 40A on the bottom of the V-belt part. The V-belt parts 11A are bonded to a tie band 12A through the upper surfaces of the tension section 34A thereof. In the tie band 12A, at least two cord fabric layers are embedded in an elastomer material so that an intermediate elastomer material layer 14a is disposed between the cord fabric layers.

An air gap 22A is provided between adjacent V-belt parts 12A. The feature of the belt 10A is similar to that of the belt 10.

The tie band 12A comprises a plurality of cord fabric layers. The cords forming the fabric layers extend obliquely with respect to the longitudinal axis of the belt in such a manner that the cords forming one fabric layer form an angle with the cords forming another fabric layer adjacent thereto. In the tie band, an intermediate elastomer material layer is provided between the adjacent fabric layers.

The V-belt parts are connected to one another by the tie band thus formed, as one unit, whereby a single uniform belt is formed. Since the tie band is stretchable longitudinally and laterally of the belt, it can freely follow the behavior of the belt when run.

The cord fabric layer in the tie band forming the belt according to the invention is made of suitable conventional fibers such as polyester, polyamide, rayon or cotton fibers low in elongation and high in strength. In this connection, where the cord fabric layer is made of polyester or polyamide synthetic fibers, the best result is obtained. The fabric layer is made of a plurality of twisted cords which are essentially in parallel. In the examples shown in FIGS. 1 and 2, only two cord fabric layers are provided in the tie band. However, if necessary, additional cord fabric layers may be provided adjacent to or remote from the two cord fabric layers.

It is preferable that the number of the additional cord fabric layers be an even number. However, an odd number of layers of additional cord fabric may also be used. However, it should be noted that the cords forming an additional cord fabric layer extend obliquely with respect to the longitudinal axis of the belt in such a manner that they form an angle with respect to the cords forming the adjacent cord fabric layer. The intermediate elastomer material layer is provided adjacent fabric layers. Furthermore, the cords forming adjacent fabric layers extend obliquely with respect to the longitudinal axis of the belt in such a manner that the cords forming one of the adjacent fabric layers form an angle with the cords forming the other fabric layer. This angle $\theta$ is in a range of from 95° to 155°, and is an obtuse angle with respect to the longitudinal direction of the belt. It is most desirable that the line dividing the angle $\theta$ formed by the cords of the adjacent fabric layers into two equal angles is in parallel with the longitudinal axis of the belt. However, it may be not in parallel with the longitudinal axis to the extent that the above-described function of the tie band is not affected.

The cord fabric layer is treated with an adhesive in a well known manner so that it is well bonded to the elastomer material layer which embeds the cord fabric layer. The elastomer material employed in the invention may be a rubber blend well known in the art, such as NR, SBR, CR and NBR or the blends thereof.

The V-belt part of the belt shown in FIG. 2 may be formed as a so-called cog type V-belt which is provided with a plurality of grooves formed in the bottom surface of the compression section to extend laterally from the belt. In this case, the belt is highly flexible longitudinally, and therefore the belt is most suitable for the use on a small diameter drive pulley. The configuration, dimension, and longitudinal pitch of the groove may be obtained in a conventional manner.

The cover 40 covering the entire surface of the V-belt part shown in FIG. 1 and the cover 40A covering the bottom surface of the V-belt part shown in FIG. 2 are woven fabric which is stretchable longitudinally of the belt. A bias cloth known in the art is most suitable as the cover. The cover is firmly bonded to the V-belt part by treating it with an adhesive. However, depending on the material thereof, the cover is bonded to the V-belt by using bonding rubber, without treating it with an adhesive.

As described before, the V-belt part 11A of the belt 10A shown in FIG. 2 is a raw edge type belt in which the elastomer material forming the compression section is exposed in the driving sides thereof. Accordingly, the coefficient of friction of the belt 10A is higher than that of the belt 10 shown in FIG. 1, and therefore the belt 10A can transmit power greater than that transmitted by the belt 10.

Depending on the use of the belt, it is required for the belt to have great rigidity laterally thereof. In this case, this requirement can be satisfied by modifying at least one of the tension sections and compression sections of the V-belt part into a rubber matrix layer in which short fibers are embedded in the elastomer material in such a manner that the short fibers are arranged across the belt.

In the above-described examples, each of the belts has three V-belt parts; however, it should be noted that the invention is not limited thereto or thereby. For instance, the belt according to the invention may have two, four or more V-belt parts.

While there has been described in connection with the preferred examples of the belt of the invention, it will be obvious to those skilled on the art that various changes and modifications may be made therein without departing from the invention.

What is claimed is:

1. An endless power transmission belt comprising; a plurality of V-belt components spaced laterally apart from one another and a tie band connecting said V-belt components together; said tie band comprising an elastomer material having a plurality of cord fabric layers embedded therein, an intermediate elastomer material layer provided between said fabric layers, and said fabric layers in said tie band made of cords, said cords extending obliquely with respect to the longitudinal axis of said belt in such a manner that the cords forming one of adjacent fabric layers do not intersect each other and form an angle $\theta$ with cords not intersecting each other forming the other adjacent fabric layer, said angle $\theta$ in the range of 95° to 155°; said tie band connecting said V-belt parts together as a single uniform structure, said tie band having high stretchability in both the lengthwise and widthwise directions of said belt, thereby permitting said tie band to conform to said V-belt components when said V-belt components are fitted in the grooves of a pulley.

2. A belt as claimed in claim 1 in which a V-belt component is essentially trapezoid in section and comprises a tension section, a compression section and a neutral axis section, said neutral axis section provided between said tension and said compression section, said V-belt components bonded to said tie band through said tension sections thereof.

3. A belt as claimed in claim 2, in which the entire outer surfaces of each V-belt component are covered with a cover cloth, and said tie band is bonded to portions of said cover cloth which correspond to said tension sections thereof to form one unit.

4. A belt as claimed in claim 2, in which each V-belt component is a raw edge type V-belt having a cover cloth only on the bottom surface thereof, and said tie band is bonded to the upper surfaces of said tension sections of said V-belt parts to form one unit.

5. A belt as claimed in claim 4, in which each V-belt component is a cog type V-belt in which a compression section thereof has a plurality of grooves extended across said belt.

6. A belt as claimed in claim 4, in which at least one of said tension section and compression section of each V-belt component is a matrix rubber layer in which fibers are selected from the group consisting of cotton, rayon, polyamide and polyester fibers and are embedded laterally of said belt.

7. A belt as claimed in claim 1, in which said cords forming said cord fabric layers are made of fibers are selected from the group consisting of cotton, rayon, polyamide and polyester fibers.

8. A belt as claimed in claim 1, in which said elastomer material forming said tie band is a rubber blend selected from the group consisting of NR, SBR, CR and NBR rubbers.

9. A belt as claimed in claim 2, further comprising a groove having an inverted-U-shaped section provided between adjacent V-belt components and through said tension section under said tie band to form an air gap wherein when said belt is fitted in a pulley, said air gap prevents the lower surface of said tie band from being brought into contact with the top portions of ribs of said pulley.

10. A belt as claimed in claim 2, in which both end portions of said tension section of each V-belt component are extended vertically through said tension section to form two vertical ends, and one of said two vertical ends spaced apart from one vertical end of a V-belt component adjacent thereto, whereby an air gap is provided which, wherein said belt is fitted in a pulley, said air gap prevents the lower surface of said tie band from being brought into contact with the top portions of ribs of said pulley.

11. A belt as claimed in claim 2 in which intersection points of line connecting laterally the centers of said cords forming said neutral axis sections and the side walls of said V-belt components are positioned inwardly of the driving side surfaces of a pulley.

* * * * *